June 2, 1936.　　　　　G. S. KNAPP　　　　　2,042,850

BRAKE

Filed Feb. 5, 1934

INVENTOR
George S. Knapp
BY
　Johnson and Lane
ATTORNEYS

Patented June 2, 1936

2,042,850

UNITED STATES PATENT OFFICE 2,042,850

BRAKE

George S. Knapp, Stillwater, Minn., assignor of thirty per cent to Fred Lammers and fifteen per cent to George H. Sullivan and Karl G. Neumeier, copartners as Sullivan and Neumeier, all of Stillwater, Minn.

Application February 5, 1934, Serial No. 709,798

3 Claims. (Cl. 188—71)

The present invention relates to a brake or clutch mechanism.

Various types or brake and clutch mechanisms have been devised, most of which comprise a disk or band of frictional material adapted to be moved into frictional engagement with a drum, or other surface to provide the necessary variable engagement between a rotating and a stationary element to accomplish the required braking or clutching operation.

An object of the present invention is to make an improved and simplified brake or clutch mechanism.

In order to attain this object, there is provided, in accordance with one feature of the invention, a plurality of hardened balls adapted to ride in a runway in a relatively movable element, the number of balls being greater than that required to provide one layer of the balls in the runway. A relatively fixed element is adapted to be moved into the runway to force the balls into compression with each other and with the runway and with said movable element to resist the rotative movement of said balls and to engage said runway and said movable element to exert a braking action between said runway and said movable element.

These and other features of the invention will be more fully brought out in the following description and the accompanying drawing, wherein.

Figure 1:
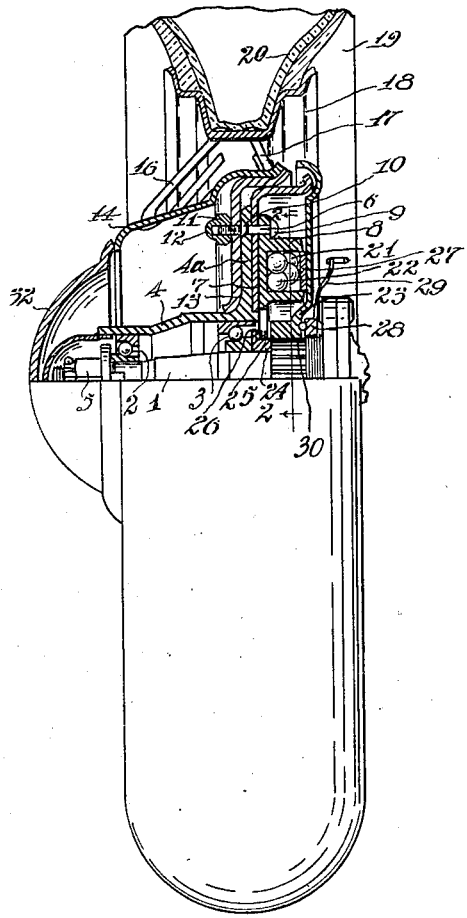
Figure 1 is a view, partly in section and partly in elevation, of an automobile wheel assembly having a brake constructed in accordance with the present invention.

Referring to the drawing in detail, an axle 1 is of a conventional type having ball races 2 and 3 surrounding said axle and rotatably supporting a wheel hub member 4. A nut 5 is threadedly mounted on the end of the axle to retain the parts in adjusted position. The hub 4 is provided with a laterally disposed flange 4—a which is secured by means of bolts 6 to a drum-like shell 7 and to a brake ball runway 8. The inner end of the bolt 6 is riveted, as at 9, and a riveted flange 10 is provided to fixedly connect the runway 8, the shell 7 and the flange 5. The outer end 11 of the bolt 6 is threaded to receive a nut 12 by which a wheel element 13 is removably secured to the hub.

A wheel element 14 is fixedly secured to the wheel element 13 and carries spokes 16 and 17 which support a rim 18 in a conventional manner. The rim 18 supports a tire casing 19 and an inner tube 20 in a conventional manner. A closure plate 32 is removably mounted over the outer end of the wheel element 14.

Figure 2:
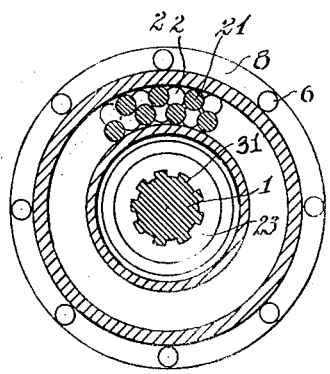
Figure 2 is a sectional view on the line 2—2 of Figure 1.

The ball runway 8 is provided with an inner layer of balls 21 and an outer layer of balls 22, the balls being of a size which preferably dispose them in the runway in substantially the relation shown in Figure 2.

An annular plate 23 is splined to the shaft 1 by spline 30 to have limited, slidable movement thereon, and a coil spring 25 surrounds a collar 24, fixedly mounted on the shaft 1, the spring 25 being held in compression between an annular flange 26 on the end of the collar 24 and the outer face of the hub portion 4 of the plate 23 to normally resiliently urge the plate 23 away from the balls 21 and 22. An annular plate 27 is securely fastened to the plate 23 to register with the runway in which the balls 21 and 22 are mounted. A brake operating element comprises an annular collar 28 threadedly mounted on the threaded inner end of the axle 1 in co-operation with the threads 31 upon the axle and is provided with an actuating lever 29 which is connected in a customary manner to a conventional brake operating pedal, not shown. In its normal position the brake operating lever 29 is moved by a conventional spring, not shown, of the type ordinarily associated with a brake operating pedal, to the released position shown in Figure 1, the coil spring 25 moving the plate 23 away from the balls in the runway 8 to permit them to rotate freely in the runway, thereby permitting free rotative movement of the runway 8 and the wheel associated therewith about the axle 1.

The operation of the device is as follows:

Normally the parts are in the position shown in Figure 1, with the lever 29 held by its customary associated parts, not shown, in a released position, wherein the spring 25 forces the splined hub portion of the plate 23 outwardly away from the balls 21 and 22, in which position the wheel is free to rotate, as the light pressure of the balls against the runway 8 and the plate 23 have no appreciable retarding action on the rotation of the wheel.

Figure 5:
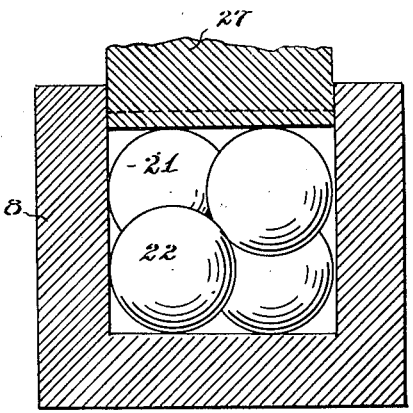
Figure 5 is a schematic view showing the action of the mechanism during a braking movement.

To apply the brake the lever 29 is partially rotated on its threaded support to force the plate 23 inwardly to bring the plate 27 into engagement with the balls 21 and 22, thereby forcing the balls into frictional engagement with each other and the runway and the plate 23, the power of the braking action exerted thereby being proportionate to the force applied (see Figure 5).

Figures 3, 4:
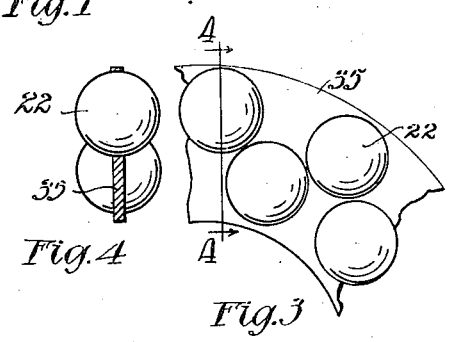
Figure 3 is a fragmentary view of a frangible plate having a plurality of balls retained therein for insertion in the device.
Figure 4 is a sectional view on the line 4—4 of Figure 3.

To release the parts the lever 29 is released by its actuating mechanism, not shown, to its normal position, whereupon the spring 25 forces the splined hub of the plate 23 outwardly, carrying the plate 27 to the released position of Figure 1, as shown in dotted lines in Figure 5, thereby freeing the balls from compressive engagement with each other and the runway and with the plate 27. The full line in Figure 5 shows the plate 27 moved downwardly into braking engagement with the balls 21 and 22. In mounting the balls in the runway it is preferred to mount each layer of balls, namely, the layer 21 and the layer 22 separately by inserting the balls in a cork gasket as illustrated in Figures 3 and 4. An annular cork gasket member 35 is provided with a plurality of perforations adapted to receive the balls therein with sufficient frictional engagement to support them in position therein, the entire gasket 35 bearing the layer of balls 21 being first inserted in the runway and then a second cork gasket carrying the second set of balls 22 being positioned above the first layer, the cork gaskets being allowed to remain in position therein. The remaining parts of the assembly are then mounted in position, as shown in Figure 1, and upon actuating the braking mechanism the balls will be rotated to free them from the gasket material. Since the gasket material is soft and readily frangible the gasket material will be ground to pieces by the action of the balls in applying the brake and the presence of the cork in the runway will not deleteriously affect the action of the mechanism.

The device is simple and effective in its operation and long lived, since the rolling action of the balls on each other have a tendency to prevent wear at any fixed point and the action of the mechanism is not affected by the presence of grease or oil in the runway, since the balls have but a single point or line of contact with each other and with the surfaces which they contact, the braking pressure applied by the plate 23 will force the balls to penetrate any film of oil or grease that may be present, thereby readily affecting engagement with each other and with the associated parts. It is preferred to provide a sufficient amount of grease in the runway so that when in normal position the balls will be free to rotate with each other and with the runway and the plate 23 so as to minimize wear of the parts.

While no specific construction is shown for embodying the invention in a clutch, it will be apparent to those versed in the art that the mechanism may be readily adapted for such and similar uses, and in the accompanying claims the word "brake" is to be interpreted as including such adaptations of the invention.

I claim:

1. A brake structure comprising a brake element having a brake face thereon, ball retaining means mounted adjacent said brake face, a frangible plate having a plurality of openings therein, mounted in said ball retaining means, a plurality of balls mounted in the openings in said plate to be initially supported thereby, a second similar frangible plate with balls similarly supported thereby superposed over said first plate, a second brake element having a brake face normally movable with respect to said first brake face, and actuating means mounted to move said brake faces into compressive frictional engagement with said balls to free said balls from said frangible plates and to destroy said plates.

2. A brake structure of the class described, comprising in combination with a rotatable element an annular channeled track mounted concentrically with said rotatable element to rotate therewith, a plurality of balls freely mounted in said track, said balls being of a number greater than that required for a single layer of said balls in said track, an annular compressor plate mounted to overlie said track, said compressor plate being slidably supported upon said rotatable element, spring means normally holding said compressor plate out of compressive engagement with said balls, and actuating means mounted to slide said compressor plate upon said rotatable element against the pressure of said spring means into compressive engagement with said balls.

3. A brake structure of the class described, comprising in combination with a rotatable element an annular channeled track mounted concentrically with said rotatable element to rotate therewith, a plurality of balls freely mounted in said track, said balls being of a greater number than that required for a single layer of balls in said track, an annular compressor plate mounted to overlie said track, said compressor plate being slidably supported upon said rotatable element, spring means normally holding said compressor plate out of compressive engagement with said balls, and actuating means mounted to slide said compressor plate upon said rotatable element against the pressure of said spring means into compressive engagement with said balls.

GEORGE S. KNAPP.